US009088985B2

(12) United States Patent
Kishiyama et al.

(10) Patent No.: US 9,088,985 B2
(45) Date of Patent: Jul. 21, 2015

(54) MOBILE STATION, BASE STATION, BASIC FREQUENCY BLOCK SPECIFYING METHOD AND BAND CONTROL METHOD

(75) Inventors: Yoshihisa Kishiyama, Yokosuka (JP); Motohiro Tanno, Yokohama (JP); Nobuhiko Miki, Yokohama (JP); Hidekazu Taoka, Tokyo (JP); Kenichi Higuchi, Saitama (JP); Mamoru Sawahashi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 480 days.

(21) Appl. No.: 12/920,710

(22) PCT Filed: Mar. 27, 2009

(86) PCT No.: PCT/JP2009/056365
§ 371 (c)(1),
(2), (4) Date: Nov. 10, 2010

(87) PCT Pub. No.: WO2009/119834
PCT Pub. Date: Oct. 1, 2009

(65) Prior Publication Data
US 2011/0051711 A1    Mar. 3, 2011

(30) Foreign Application Priority Data
Mar. 28, 2008    (JP) .................................. 2008-088104

(51) Int. Cl.
*H04J 3/06* (2006.01)
*H04W 72/04* (2009.01)
(Continued)

(52) U.S. Cl.
CPC .............. *H04W 72/048* (2013.01); *H04J 3/06* (2013.01); *H04L 5/006* (2013.01); *H04L 5/0007* (2013.01);
(Continued)

(58) Field of Classification Search
CPC .......................................................... H04J 3/06
USPC .................. 370/330, 329, 331, 350; 375/260; 455/67.11, 561, 63.3, 101
See application file for complete search history.

(56) References Cited

U.S. PATENT DOCUMENTS 6,785,514 B1 *    8/2004    Raaf ............................ 455/63.3
8,270,365 B2 *    9/2012    Jeong et al. .................... 370/331
(Continued)

FOREIGN PATENT DOCUMENTS

CN    101132608 A    2/2008
EP    2056611 A1    5/2009
(Continued)

OTHER PUBLICATIONS

NTT Docomo Inc., "Update Views on Support of Wider Bandwidth in LTE-Advanced," 3GPP TSG RAN WG1 Meeting #54, R1-083015, [online], Aug. 18, 2008, retrieved from the Internet: <URL: http://www.3gpp.org/ftp/tsg_ran/WG1_RL1/TSGR1_54/Docs/R1-083015.zip> 19 pages.
(Continued)

*Primary Examiner* — Helal A Algahaim
*Assistant Examiner* — Mahmoud Ismail
(74) *Attorney, Agent, or Firm* — Osha Liang LLP

(57) ABSTRACT

A base station includes a receiving unit configured to receive a UE capability regarding a bandwidth from a mobile station; and a specifying unit configured to specify, among plural basic frequency blocks included in a system band, one or more basic frequency blocks to be used by the mobile station based on the UE capability.

10 Claims, 14 Drawing Sheets

(51) Int. Cl.
- *H04L 5/00* (2006.01)
- *H04W 4/00* (2009.01)
- *H04B 1/00* (2006.01)
- *H04B 1/02* (2006.01)
- *H04B 7/02* (2006.01)
- *H04B 17/00* (2006.01)
- *H04B 1/38* (2006.01)
- *H04L 27/28* (2006.01)

(52) U.S. Cl.
CPC ............ *H04L 5/0037* (2013.01); *H04L 5/0044* (2013.01); *H04L 5/0053* (2013.01); *H04L 5/0092* (2013.01)

(56) References Cited

U.S. PATENT DOCUMENTS

| | | | |
|---|---|---|---|
| 2009/0176463 A1* | 7/2009 | Raaf et al. | 455/101 |
| 2009/0196249 A1* | 8/2009 | Kawamura et al. | 370/330 |
| 2009/0220014 A1* | 9/2009 | Higuchi et al. | 375/260 |
| 2009/0296563 A1 | 12/2009 | Kishiyama et al. | |
| 2010/0142457 A1* | 6/2010 | Chun et al. | 370/329 |
| 2010/0210218 A1* | 8/2010 | Iwamura et al. | 455/67.11 |
| 2012/0230320 A1 | 9/2012 | Kishiyama et al. | |

FOREIGN PATENT DOCUMENTS

| | | |
|---|---|---|
| JP | 2007-194868 A | 8/2007 |
| KR | 1020070091230 A | 9/2007 |
| KR | 1020070092578 A | 9/2007 |
| WO | 2006/134949 A1 | 12/2006 |
| WO | WO 2006134948 A1 * | 12/2006 |
| WO | WO 2007148583 A1 * | 12/2007 |
| WO | 2008023613 A1 | 2/2008 |
| WO | WO 2008023613 A1 * | 2/2008 |

OTHER PUBLICATIONS

3GPP TS 36.306 V8.1.0, Mar. 2008, "Evolved Universal Terrestrial Radio Acess (E-UTRA) User Equipment (UE) radio access capabilities," 13 pages.
International Search Report issued in PCT/JP2009/056365, mailed on Apr. 21, 2009, with translation, 7 pages.
Written Opinion issued in PCT/JP2009/056365, mailed on Apr. 21, 2009, 3 pages.
Patent Abstracts of Japan, Publication No. 2007-194868, dated Aug. 2, 2007, 1 page.
Office Action for Chinese Application No. 200980110370.8 dated Oct. 10, 2012, with English translation thereof (13 pages).
Patent Abstract for Chinese Publication No. 101132608 published Feb. 27, 2008 (1 page).
Office Action for Russian Application No. 2010142261/07 dated Sep. 21, 2012, with English translation thereof (10 pages).
Espacenet—Patent Abstract for International Publication No. 2006134949 published Dec. 21, 2006 (1 page).
Office Action in counterpart Philippine Patent Application No. 1-2010-502175, mailed Jun. 5, 2014 (2 pages).
Office Action in counterpart Chinese Patent Application No. 200980110370.8, with English translation reporting same, dated Feb. 16, 2015 (21 pages).
Office Action in counterpart Korean Patent Application No. 10-2010-7019768, with English translation thereof, dated Feb. 17, 2015 (10 pages).

* cited by examiner

PRIOR ART

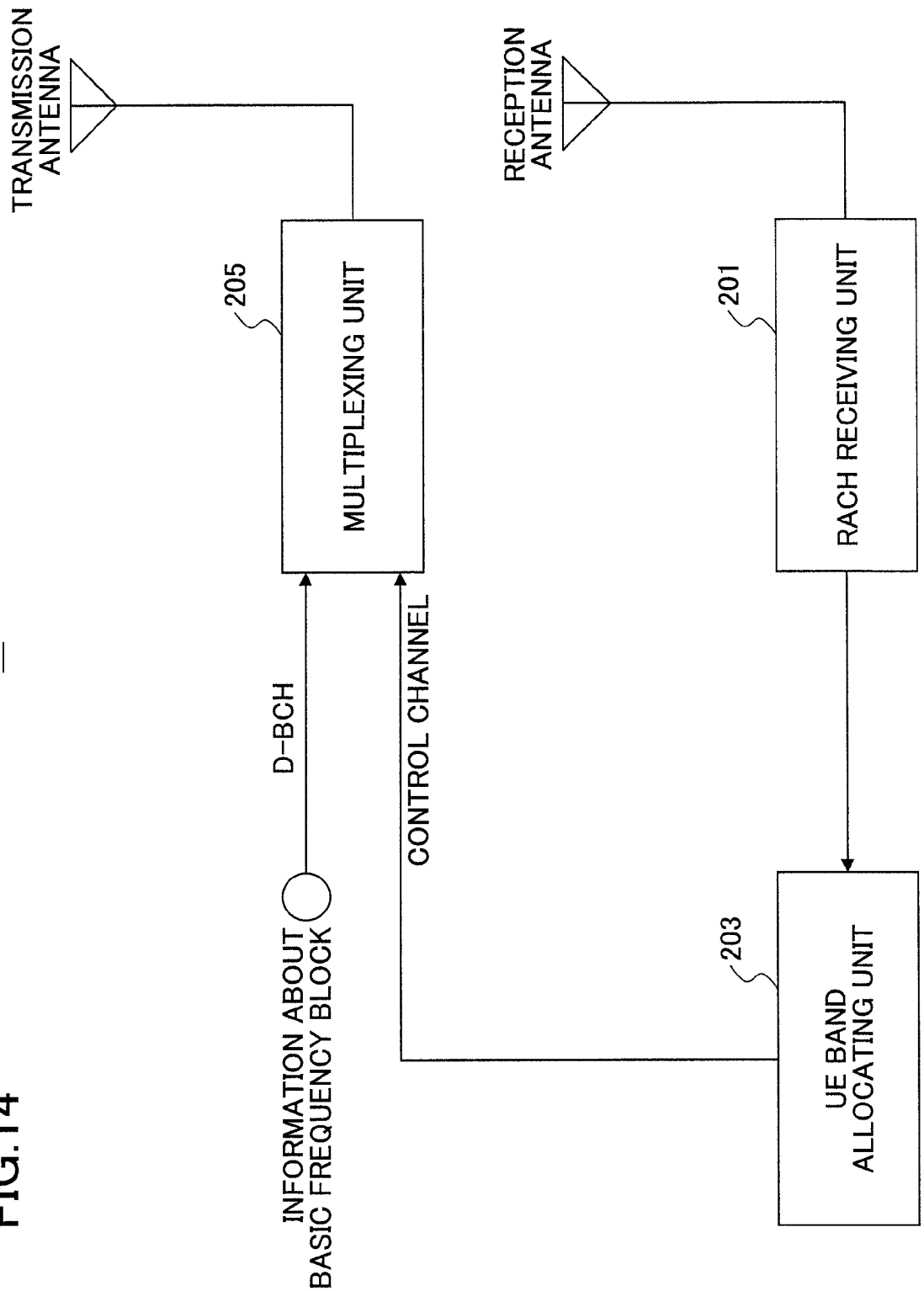

MOBILE STATION, BASE STATION, BASIC FREQUENCY BLOCK SPECIFYING METHOD AND BAND CONTROL METHOD

TECHNICAL FIELD

The present invention relates to a mobile station, a base station, and a band allocating method.

BACKGROUND ART

In 3GPP (3rd Generation Partnership Project), radio interfaces for E-UTRA (Evolved UMTS Terrestrial Radio Access) are standardized. The system bandwidth defined for E-UTRA is 1.4 MHz at the minimum and 20 MHz at the maximum, the maximum downlink data rate is 300 Mbps, and the maximum uplink data rate is 75 Mbps (see 3GPP TS36.306 (V8.1.0)).

Depending on the maximum system bandwidth of 20 MHz for E-UTRA, the maximum transmission and reception bandwidth of a mobile station for E-UTRA is 20 MHz. As shown in FIG. 1, the mobile station can transmit and receive with the bandwidth of 5 MHz when the system bandwidth is 5 MHz, and the mobile station can transmit and receive with the bandwidth of 20 MHz when the system bandwidth is 20 MHz, for example.

DISCLOSURE OF INVENTION

Problem(s) to be Solved by the Invention

In a future radio access system such as IMT-Advanced (also referred to as LTE-Advanced in 3GPP), a higher data rate (for example, the maximum downlink data rate of 1 Gbps) is required. Depending on such a higher data rate, a wider system bandwidth (for example, the maximum system bandwidth of 100 MHz) is required.

On the other hand, in order to achieve orderly (smooth) transition from the existing system such as E-UTRA to the future radio access system, full support of the existing terminals such as E-UTRA terminals is required.

In order to satisfy these requirements, the future radio access system needs to support UE (User Equipment) capabilities of plural maximum transmission and reception bandwidths. For example, as shown in FIG. 2, the future radio access system needs to support both the mobile station which can transmit and receive with the bandwidth of 100 MHz (or a portion thereof) and the mobile station which can transmit and receive with the bandwidth of 20 MHz.

Provided that E-UTRA terminals are fully supported in IMT-Advanced, it is assumed that the minimum value of the maximum transmission and reception bandwidths is 20 MHz. Accordingly, it is required that both terminals (E-UTRA terminals) which can transmit and receive data with the maximum bandwidth of 20 MHz at most and terminals (IMT-A terminals or IMT-Advanced terminals) which can transmit and receive data with the transmission and reception bandwidth of 20 MHz or more be supported in IMT-Advanced.

It is a general object of the present invention to support both existing terminals such as E-UTRA terminals and new terminals such as IMT-A terminals, and to efficiently allocate bands to these terminals.

Means for Solving the Problem(s)

In one aspect of the present invention, there is provided a base station, including:

a receiving unit configured to receive a UE capability regarding a bandwidth from a mobile station; and a specifying unit configured to specify, among plural basic frequency blocks included in a system band, one or more basic frequency blocks to be used by the mobile station based on the UE capability.

In another aspect of the present invention, there is provided a mobile station, including:

a transmitting unit configured to transmit a UE capability regarding a bandwidth to a base station; and a control unit configured to set, among plural basic frequency blocks included in a system band, a transmission or reception band to one or more basic frequency blocks specified by the base station based on the UE capability.

In another aspect of the present invention, there is provided a basic frequency block specifying method in a base station, including the steps of:

receiving a UE capability regarding a bandwidth from a mobile station; and specifying, among plural basic frequency blocks included in a system band, one or more basic frequency blocks to be used by the mobile station based on the UE capability.

In another aspect of the present invention, there is provided a band control method in a mobile station, including the steps of:

transmitting a UE capability regarding a bandwidth to a base station; and setting, among plural basic frequency blocks included in a system band, a transmission or reception band to one or more basic frequency blocks specified by the base station based on the UE capability.

Advantageous Effect of the Invention

According to an embodiment of the present invention, it is possible to support both existing terminals such as E-UTRA terminals and new terminals such as IMT-A terminals, and to efficiently allocate bands to these terminals.

BRIEF DESCRIPTION OF THE DRAWINGS

FIG. 14 shows a block diagram of a base station in accordance with an embodiment of the present invention.

DETAILED DESCRIPTION OF THE PREFERRED EMBODIMENTS

Figure 1:
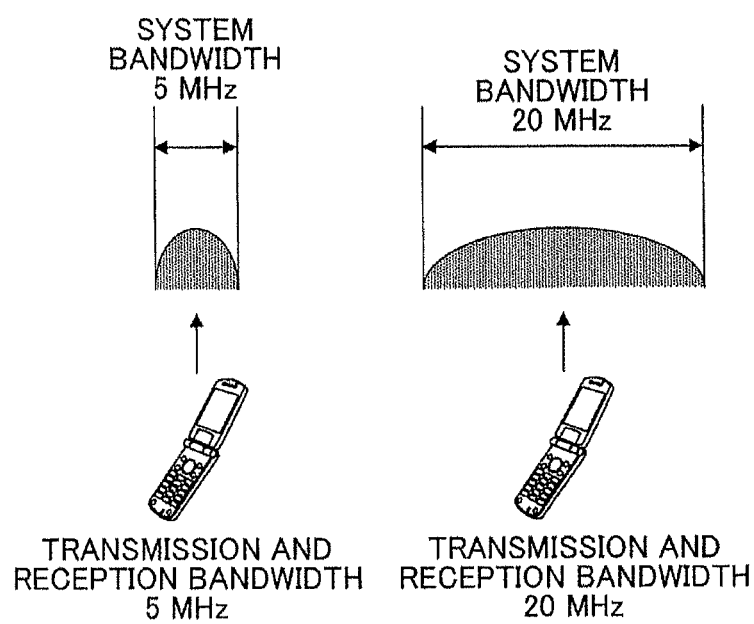
FIG. 1 shows a relationship between a system bandwidth and a transmission and reception bandwidth for E-UTRA.
Figure 2:
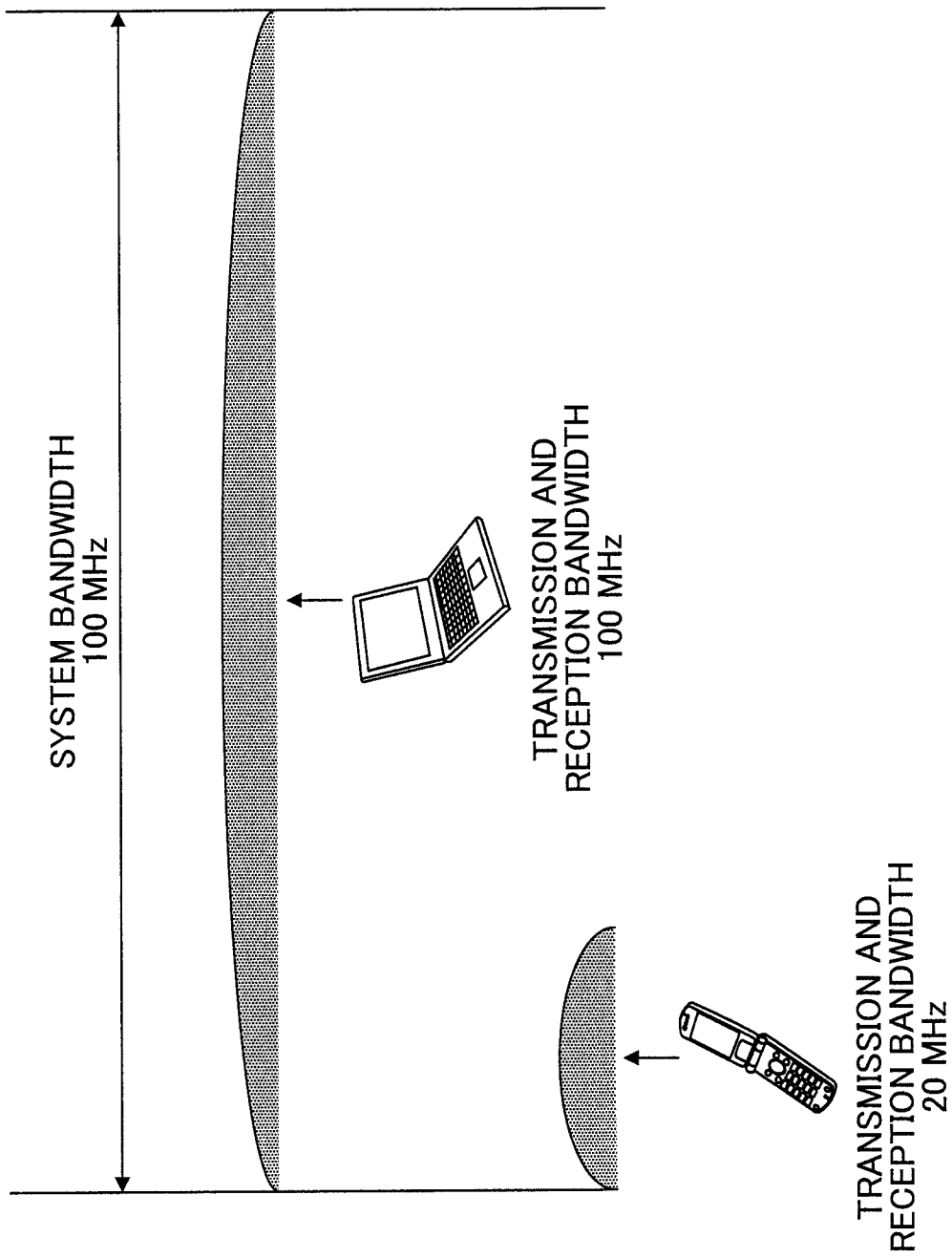
FIG. 2 shows a relationship between a system bandwidth and a transmission and reception bandwidth for a radio access system in accordance with an embodiment of the present invention.

Description of Notations 10 mobile station
101 RF reception circuit
103 band control unit
105 CP removing unit
107 FFT unit
109 demultiplexing unit
111 decoding unit
151 encoding unit
153 multiplexing unit
155 IFFT unit
157 CP adding unit
159 RF transmission circuit
161 band control unit
20 base station
201 RACH receiving unit
203 UE band allocating unit
205 multiplexing unit

BEST MODE OF CARRYING OUT THE INVENTION

With reference to the accompanying drawings, embodiments of the present invention are described below.

<Concept of a Layered Bandwidth Configuration or a Layered OFDMA Configuration>

Figure 3:
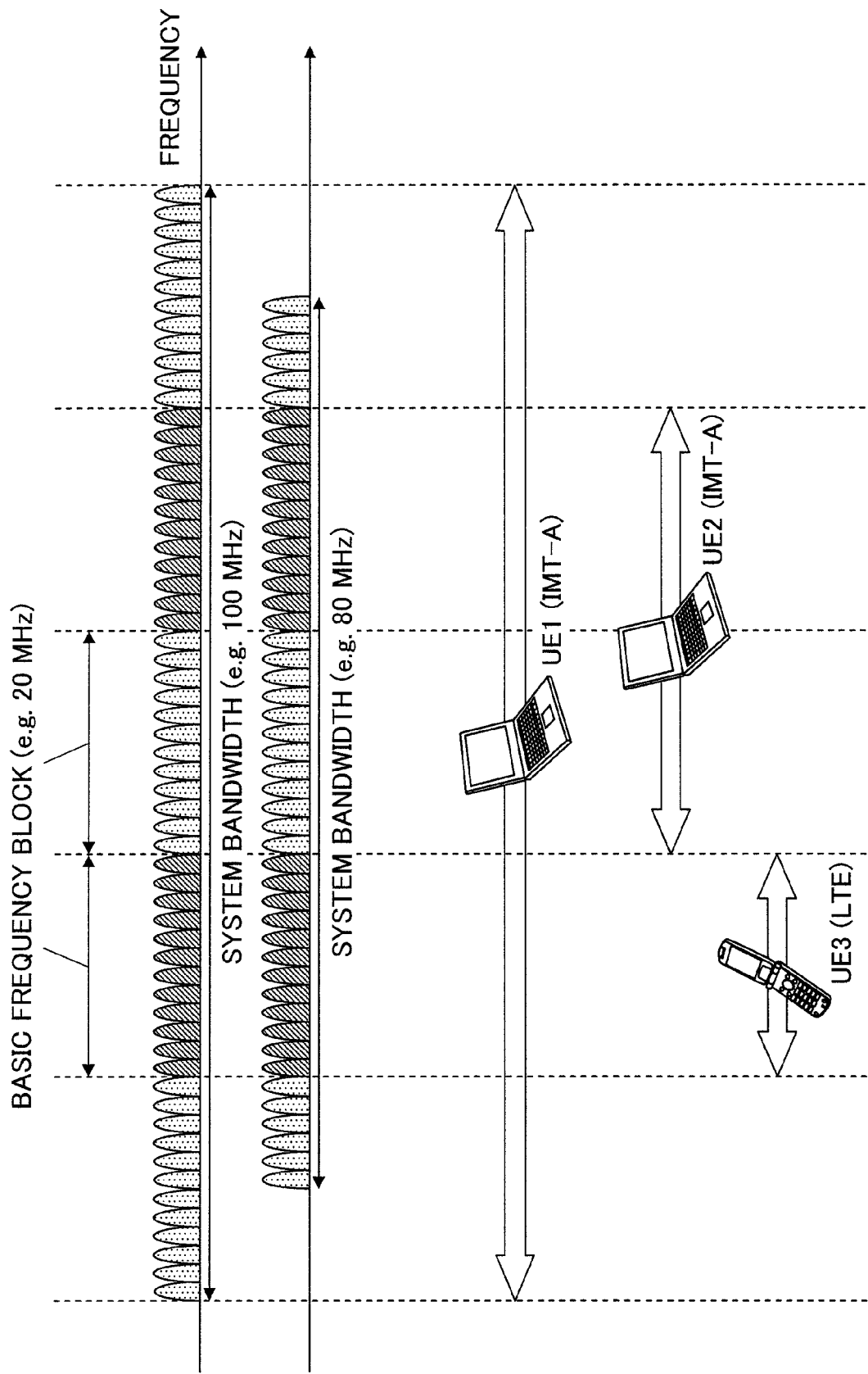
FIG. 3 shows a conceptual diagram of a layered bandwidth configuration in a radio access system in accordance with an embodiment of the present invention.

With reference to FIG. 3, the concept of a bandwidth configuration (layered bandwidth configuration) in a radio access system in accordance with an embodiment of the present invention is described below. It is assumed that requirements for IMT-Advanced are to be satisfied in the radio access system in accordance with the embodiment of the present invention. To provide a wider system bandwidth, it is assumed that the radio access system has the system bandwidth of 100 MHz, for example. In this case, the whole system band can be divided into five frequency blocks of 20 MHz. The frequency block of 20 MHz corresponding to the maximum transmission and reception bandwidth of the E-UTRA terminal is referred to as a basic frequency block. The bandwidth of the basic frequency block is referred to as a basic bandwidth. In other words, the basic frequency block corresponds to the minimum value of the maximum transmission and reception bandwidths of terminals (also referred to as UE (User Equipment) terminals, mobile stations, or mobile terminals) supported in the radio access system. In FIG. 3, the center frequency of the center basic frequency block is the same as the center frequency of the system band, since the whole system band can be divided into an odd number of basic frequency blocks.

When the radio access system has the system bandwidth of 80 MHz, for example, the whole system band can be divided into four basic frequency blocks. However, as shown in FIG. 3, the whole system band may be divided into basic frequency blocks, such that the center frequency of the center basic frequency block is the same as the center frequency of the system band. In this case, the whole system band is formed by plural basic frequency blocks and the remaining subcarriers.

In this manner, by forming a wide system band using plural basic frequency blocks (and the remaining subcarriers) each of which can be supported in E-UTRA, it is possible to fully support E-UTRA terminals. At the same time, it is possible to support new terminals (IMT-A terminals) which have a wider transmission and reception bandwidth than the E-UTRA system bandwidth (the bandwidth of the basic frequency block), since plural basic frequency blocks (multiple signal bandwidths) can be allocated to the new terminals (IMT-A terminals). In other words, the E-UTRA terminals can communicate using the basic frequency block, which is a portion of the whole system band. In addition, the IMT-A terminals can communicate using plural basic frequency blocks depending on their UE capabilities. It should be noted that the transmission and reception bandwidth is not necessarily equal to the UE capability. This is because the frequency diversity effect cannot be achieved even though the transmission and reception bandwidth is wider than a predetermined value. This is also because overhead of control information to report CQI (channel quality indicator) increases due to the wider transmission and reception bandwidth.

<Examples of Combining Basic Frequency Blocks>

With reference to FIGS. 4-7, examples of combining plural basic frequency blocks are described below.

Figure 4:
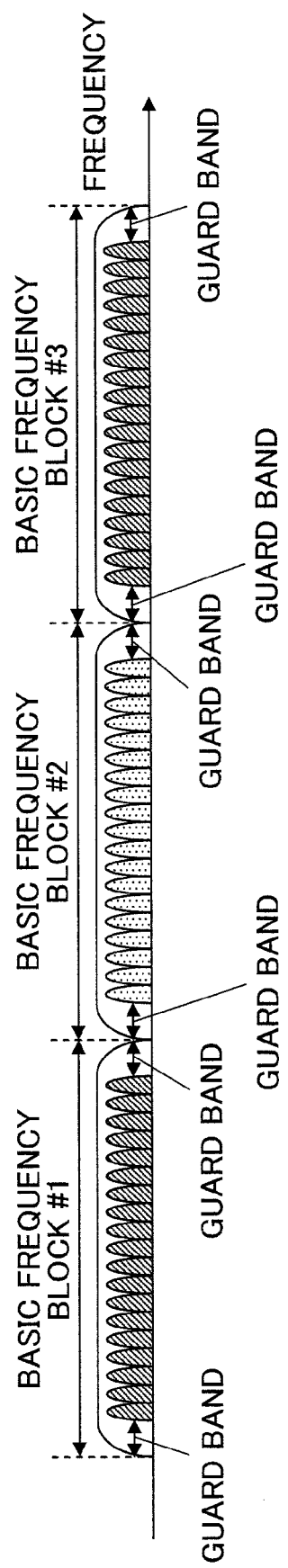
FIG. 4 shows a first example of combining basic frequency blocks.

FIG. 4 shows an example of combining basic frequency blocks in consideration of guard bands in the respective basic frequency blocks. In E-UTRA, a guard band of 1 MHz is provided at the both ends of the system band of 20 MHz, in order to reduce interference among systems. In other words, the frequency of 18 MHz can be used for the signal bandwidth. In a radio access system in accordance with an embodiment of the present invention, adjacent basic frequency blocks including the guard band of 1 MHz at the both ends of the system band may be combined.

Figure 5:
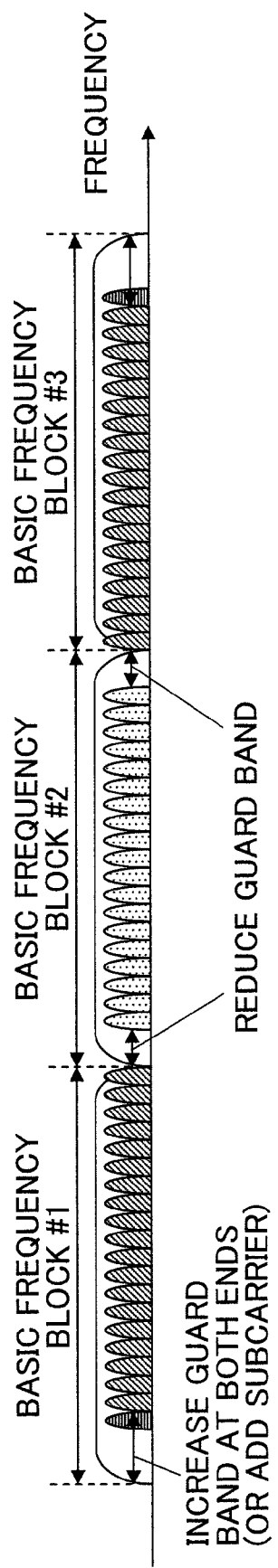
FIG. 5 shows a second example of combining basic frequency blocks.

FIG. 5 shows an example of combining basic frequency blocks such that each guard band between adjacent basic frequency blocks is reduced. In the same radio access system, interference among basic frequency blocks can be reduced by allocation of orthogonal radio resources. In other words, the guard band between adjacent basic frequency blocks can be reduced. In FIG. 5, the frequency of 1 MHz corresponding to one of the guard bands in the adjacent frequency blocks is used for the signal band. When the guard band between the adjacent frequency blocks is reduced, unused bands appear at the both ends of the system band. These unused bands may be used for guard bands or signal bands. Increasing the guard bands at the both ends of the system band can reduce interference with neighbor systems. On the other hand, increasing the signal bands can improve transmission efficiency.

Figure 6:
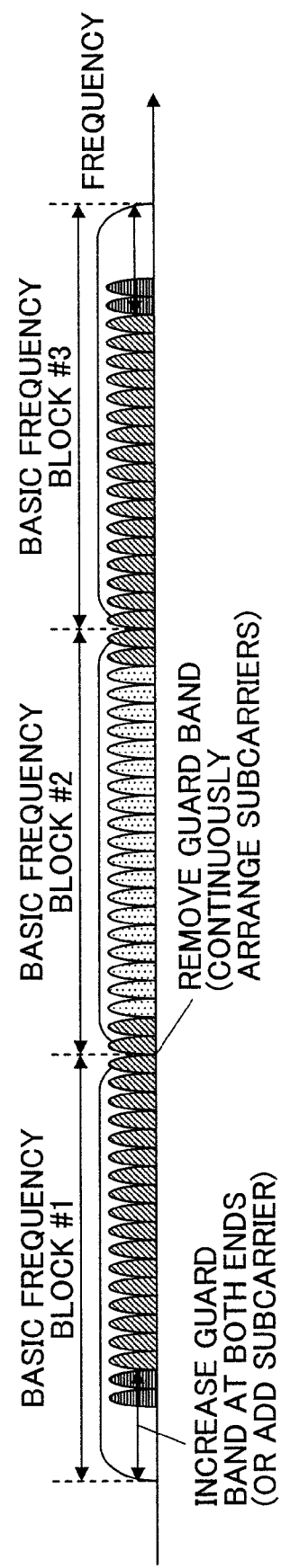
FIG. 6 shows a third example of combining basic frequency blocks.

FIG. 6 shows an example of combining basic frequency blocks such that each guard band between adjacent basic frequency blocks is removed. As described above, in the same radio access system, interference among basic frequency blocks can be reduced by allocation of orthogonal radio resources. Thus, the guard band between adjacent basic frequency blocks can be removed. The example shown in FIG. 6 has wider unused bands at the both ends of the system band, compared to the example shown FIG. 5. These unused bands may be used for guard bands or signal bands.

Figure 7:
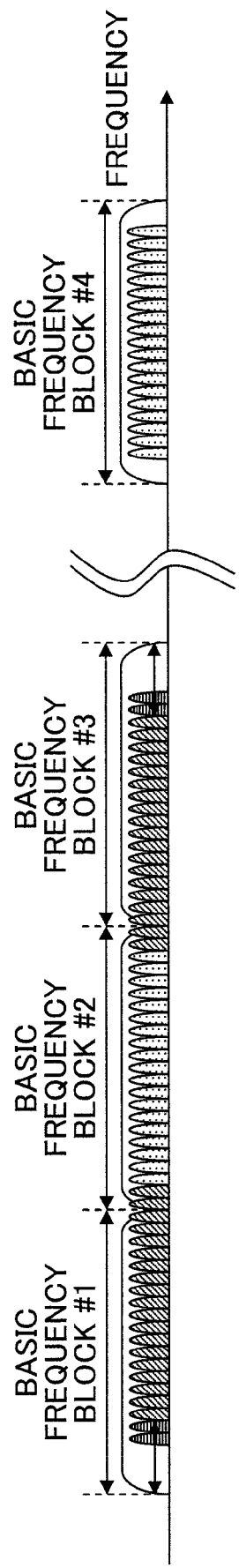
FIG. 7 shows a fourth example of combining basic frequency blocks.

FIG. 7 shows an example where the system band of the radio access system is discontinuous. Due to frequency allocation to other systems, it may not be possible to continuously reserve the wide system band of 100 MHz. In this case, each guard band between adjacent basic frequency blocks (between the basic frequency blocks #1 and #2 and between the basic frequency blocks #2 and #3) can be reduced or removed. On the other hand, since the basic frequency block #4 has no adjacent basic frequency block, its guard bands cannot be reduced or removed.

It should be noted that the layered bandwidth configuration described with reference to FIG. 3 can be applied to the case where the system band is discontinuous as shown in FIG. 7.

<Flowchart of a Band Allocating Method>

Figure 8:
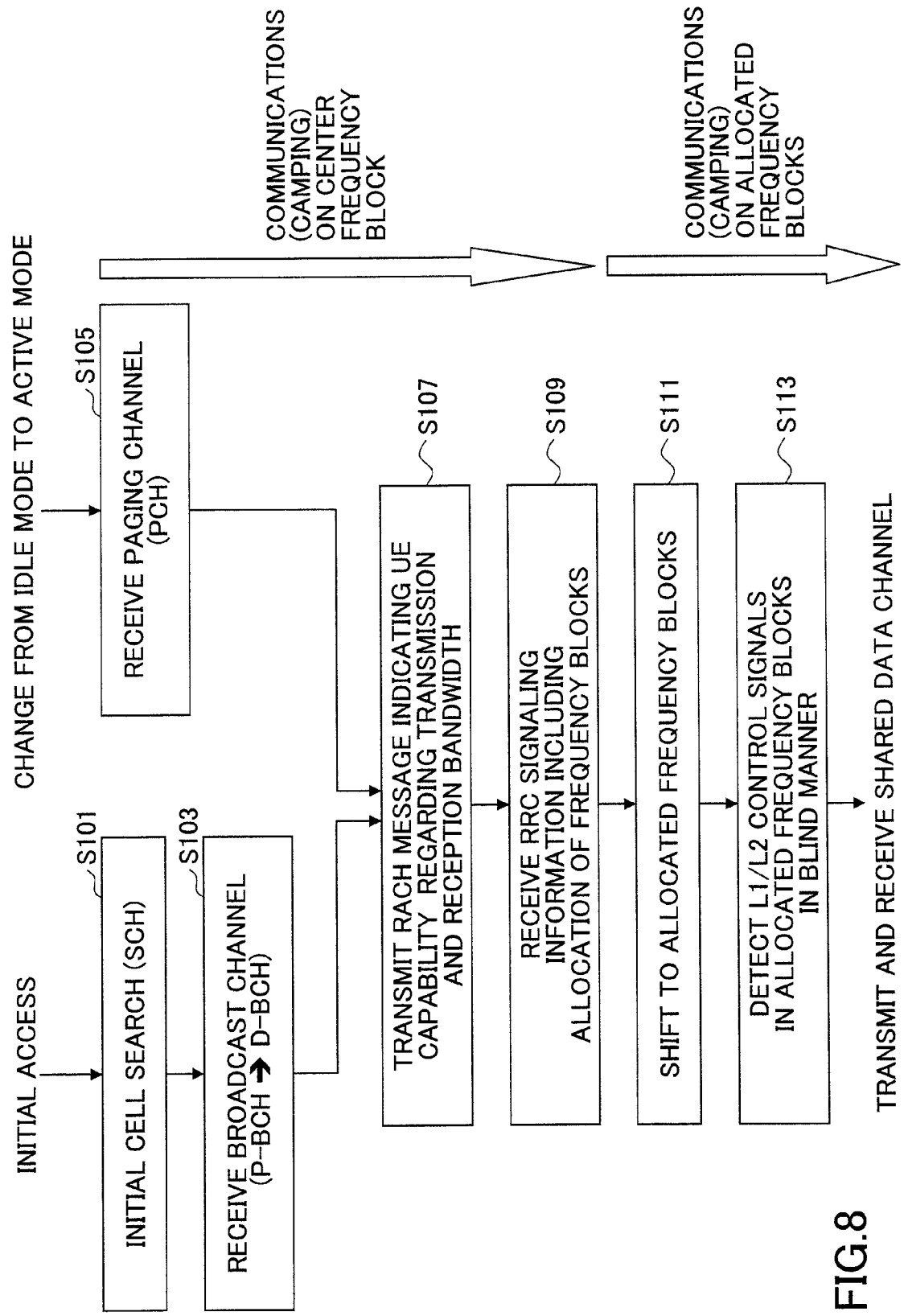
FIG. 8 shows a flowchart of a band allocating method in accordance with an embodiment of the present invention.

With reference to FIG. 8, a flowchart of a band allocating method in accordance with an embodiment of the present invention is described below.

First, upon power-up, before entering into a soft-handover mode, or during a discontinuous reception mode, the mobile station performs initial cell search to detect a cell in which communications are to be performed (S101). The mobile station performs initial cell search by receiving a predetermined signal sequence on the SCH (synchronization channel) from the base station. The initial cell search is performed in a predetermined basic frequency block among plural basic frequency blocks included in the system band. For example, the initial cell search may be performed in a center basic frequency block of the system band. After a cell is detected, the mobile station receives preliminary information about the system band and the basic frequency blocks on the broadcast channel (S103). For example, the mobile station obtains band information about the basic frequency block (the predetermined basic frequency block) on the PBCH (physical broadcast channel or primary BCH) and obtains band information about the whole system band and/or information about the frequency position of each basic frequency block on the D-BCH (dynamic broadcast channel or secondary BCH).

When the mobile station in a standby status (idle mode) receives a call from the base station, the mobile station switches to an active mode. At this moment, the mobile station uses the PCH (paging channel) to identify that it receives the call (S105). When the PCH is transmitted only in the center basic frequency block, the paging is also performed in the center basic frequency block. Alternatively, the paging may be performed in other basic frequency blocks.

The mobile station transmits a RACH (random access channel) preamble on the random access channel to transmit a RACH message to the base station indicating the UE capability (the capability of the mobile station) regarding the transmission and reception bandwidth (S107). As used herein, the RACH preamble refers to control information transmitted on the random access channel, and the RACH message refers to control information transmitted with a specified radio resource after the mobile station receives a response indicating that the base station has received the RACH preamble. The RACH preamble may be associated with the UE capability in advance in the mobile station and the base station. The mobile station may report the UE capability to the base station by transmitting the RACH preamble associated with the UE capability.

Then, the base station allocates one or more basic frequency blocks depending on the UE capability, and the mobile station receives RRC (Radio Resource Control) signaling information including the one or more basic frequency blocks allocated by the base station (S109). Steps S101-S103 and S107-S109 are preformed in the predetermined basic frequency block (for example, the center basic frequency block) among plural basic frequency blocks included in the system band.

The mobile station shifts to the frequency position corresponding to the allocated one or more basic frequency blocks based on the preliminary information on the broadcast channel and the RRC signaling information (S111). Then, the mobile station detects L1/L2 control signals in a blind manner (S113). The mobile station transmits and receives data on the shared data channel based on information specified by the L1/L2 control signals. For example, the mobile station transmits and receives data using resources allocated by the base station scheduler in the allocated one or more basic frequency blocks.

The mobile station may continue communications (camping) in the same basic frequency block after completion of data transmission and reception. Alternatively, the mobile station gets back to the predetermined basic frequency block (for example, the center basic frequency block) for subsequent communications (camping).

<Exemplary Configurations of a Synchronization Channel and a Broadcast Channel>

With reference to FIGS. 9-12, exemplary configurations of the synchronization channel and the broadcast channel are described below.

The synchronization channel is used for initial cell search and neighbor cell search. The synchronization channel is transmitted according to predetermined requirements. For example, the synchronization channel has to be on the 200 kHz raster in E-UTRA. For example, the synchronization channel is placed on the center frequency of the center basic frequency block. It should be noted that the synchronization channel may not be on the 200 kHz raster in the other basic frequency blocks. In order to maintain compatibility with E-UTRA, the synchronization channel is configured according to the same requirements as those for E-UTRA. For example, the synchronization channel is transmitted every 5 ms and the broadcast channel is transmitted every 10 ms.

The broadcast channel includes the PBCH and the D-BCH. For example, band information about the basic frequency block (the center basic frequency block) is transmitted on the PBCH, while band information about the whole system band and/or information about the frequency position of each basic frequency block is transmitted on the D-BCH.

Figure 9:
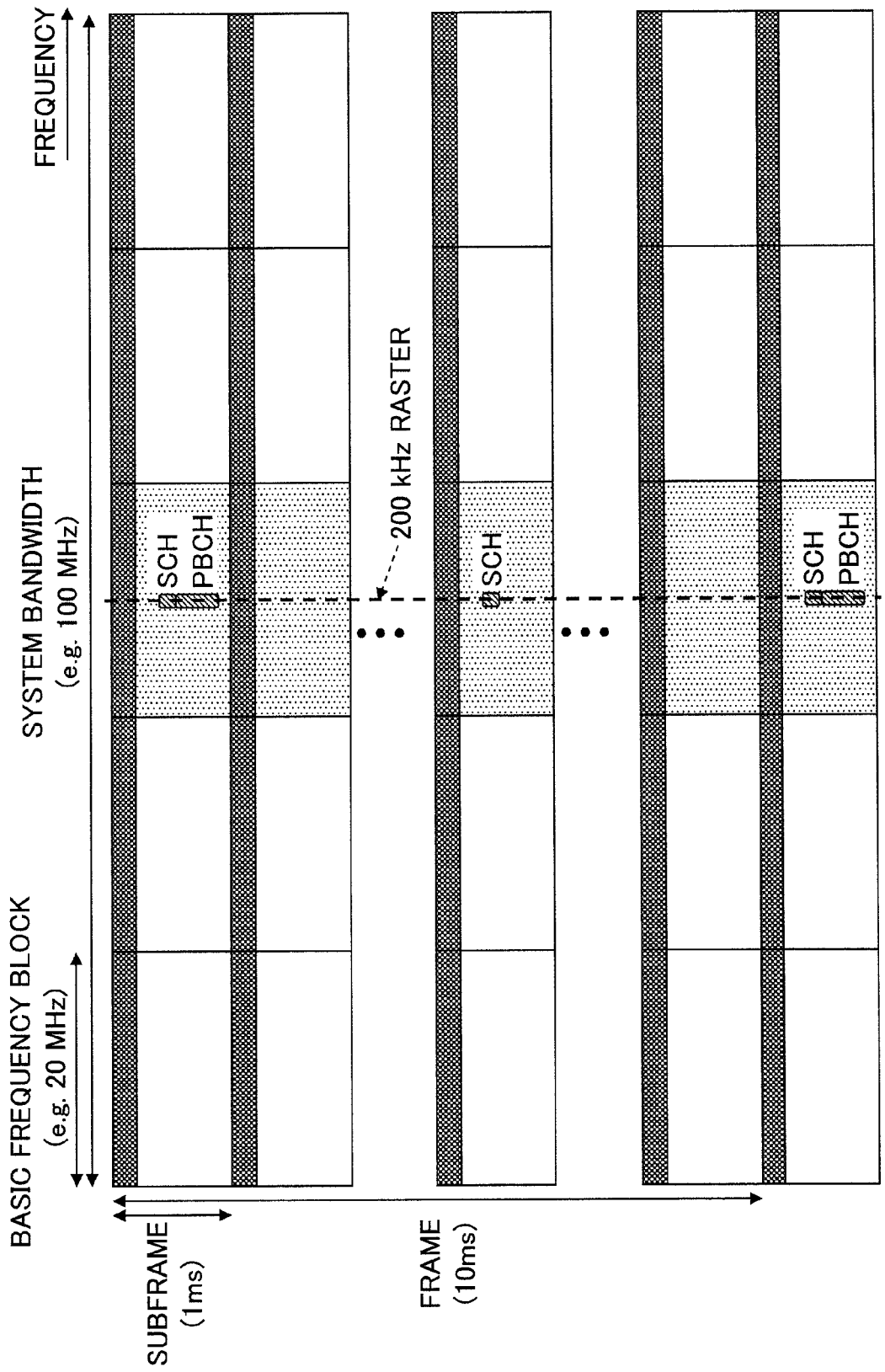
FIG. 9 shows a first exemplary configuration of a synchronization channel and a broadcast channel in accordance with an embodiment of the present invention.

FIG. 9 shows a first exemplary configuration of the synchronization channel and the broadcast channel, when the system band (for example, 100 MHz) includes plural basic frequency blocks (for example, 20 MHz). In the first exemplary configuration, the synchronization channel and the broadcast channel are mapped to a predetermined basic frequency block (for example, the center basic frequency block). According to this channel configuration, the mobile station needs to shift to the frequency blocks which are allocated to the mobile station in step S111 in FIG. 8, and get back to the original predetermined basic frequency block after transmitting and receiving data in order to receive information on the synchronization channel and broadcast channel. Mapping the synchronization channel and the broadcast channel to a single basic frequency block in this manner can prevent overhead of the synchronization channel and the broadcast channel from increasing.

Figure 10:
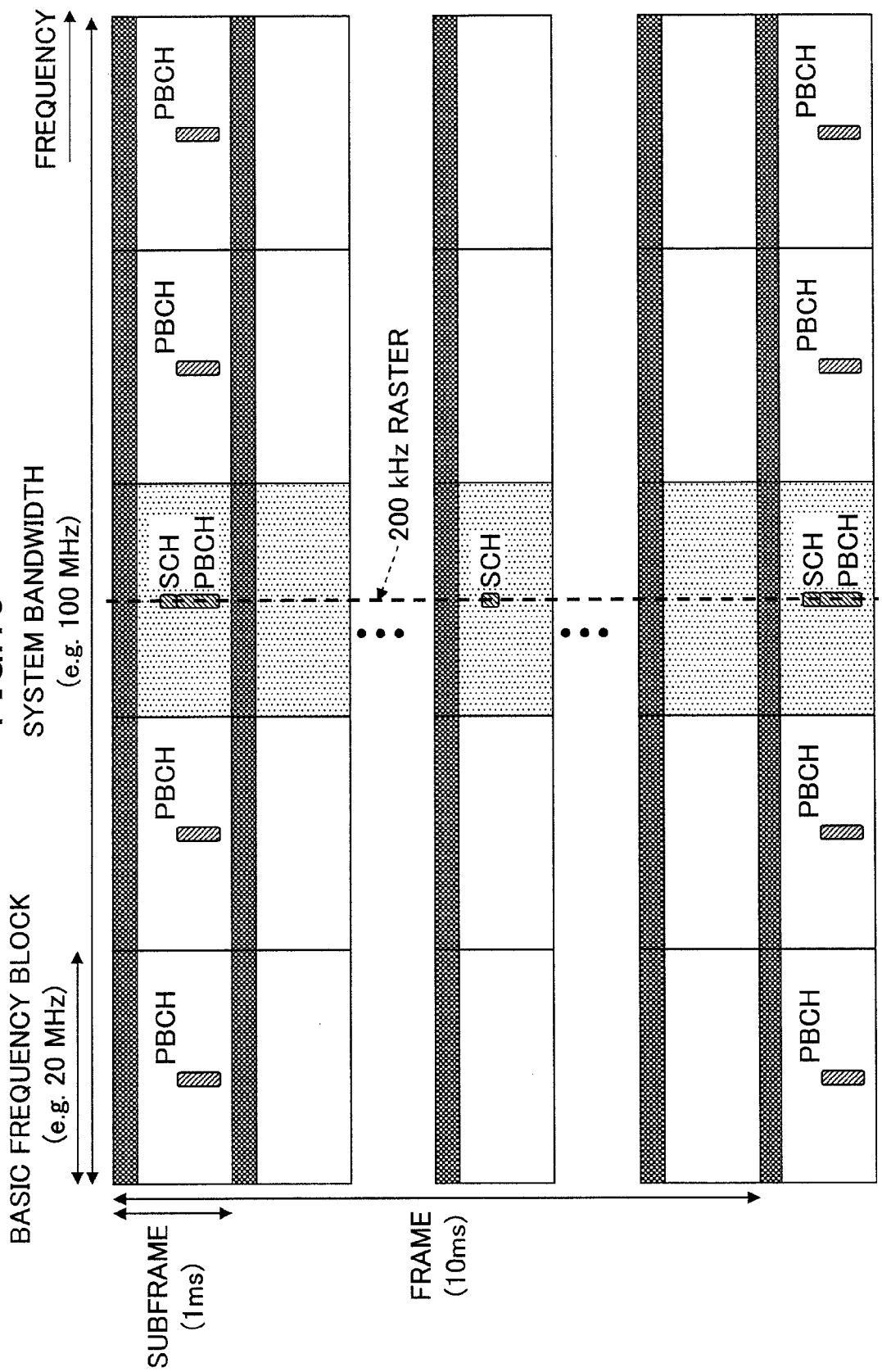
FIG. 10 shows a second exemplary configuration of a synchronization channel and a broadcast channel in accordance with an embodiment of the present invention.

FIG. 10 shows a second exemplary configuration of the synchronization channel and the broadcast channel. In the second exemplary configuration, the synchronization channel is mapped to a predetermined basic frequency block (for example, the center basic frequency block) and the broadcast channel is mapped to all the basic frequency blocks. According to this channel configuration, the mobile station needs to shift to the frequency blocks which are allocated to the mobile station in step S111 in FIG. 8, and get back to the original predetermined basic frequency block after transmitting and receiving data in order to receive information on the synchronization channel (in order to perform neighbor cell search). On the other hand, the mobile station need not get back to the original predetermined basic frequency block in order to receive information on the broadcast channel.

Figure 11:
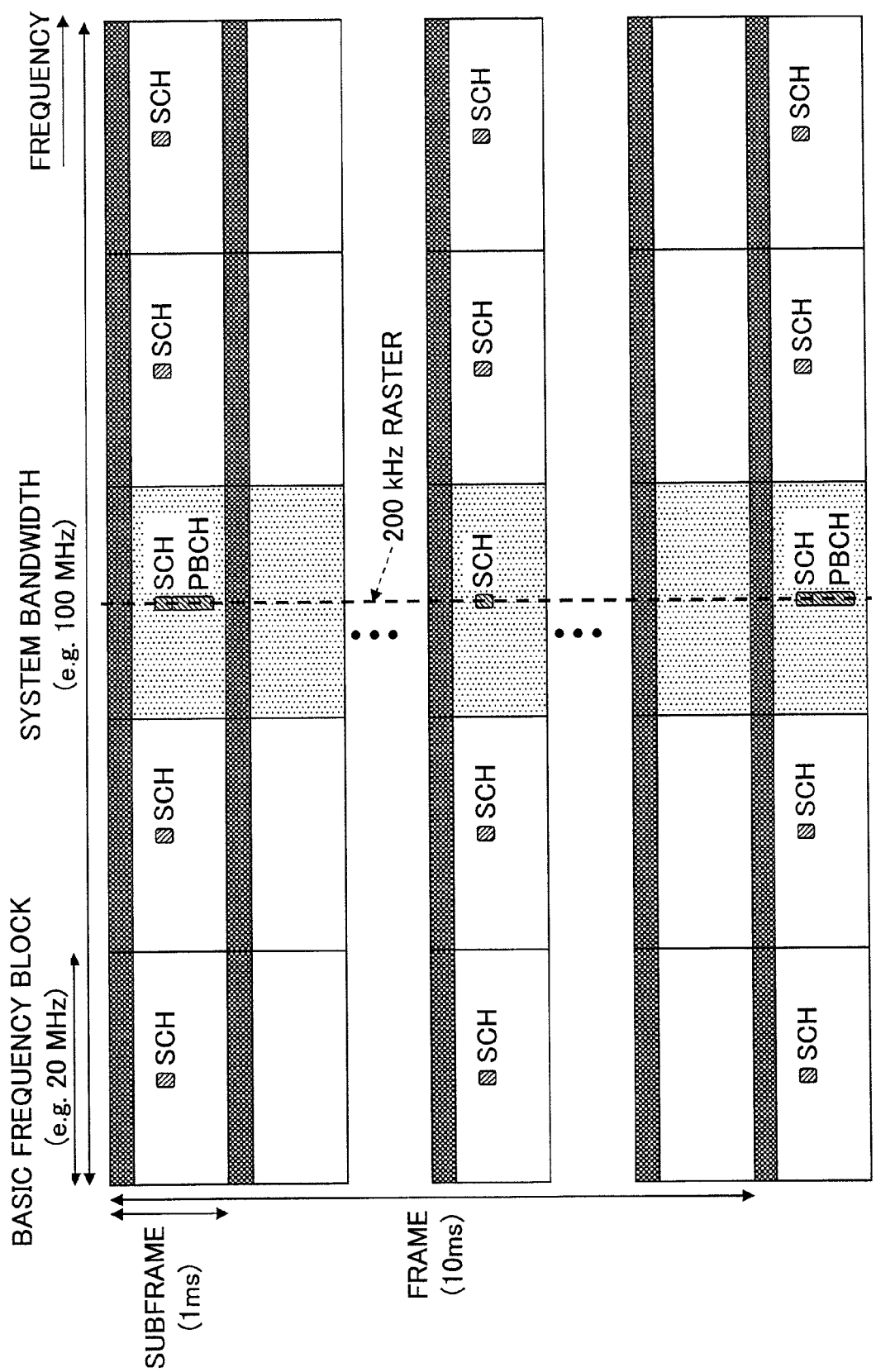
FIG. 11 shows a third exemplary configuration of a synchronization channel and a broadcast channel in accordance with an embodiment of the present invention.

FIG. 11 shows a third exemplary configuration of the synchronization channel and the broadcast channel. In the third exemplary configuration, the synchronization channel is mapped to all the basic frequency blocks and the broadcast channel is mapped to a predetermined basic frequency block (for example, the center basic frequency block). According to this channel configuration, the mobile station needs to shift to the frequency blocks which are allocated to the mobile station in step S111 in FIG. 8, and get back to the original predetermined basic frequency block after transmitting and receiving data in order to receive information on the broadcast channel. On the other hand, the mobile station need not get back to the original predetermined basic frequency block in order to receive information on the synchronization channel.

Figure 12:
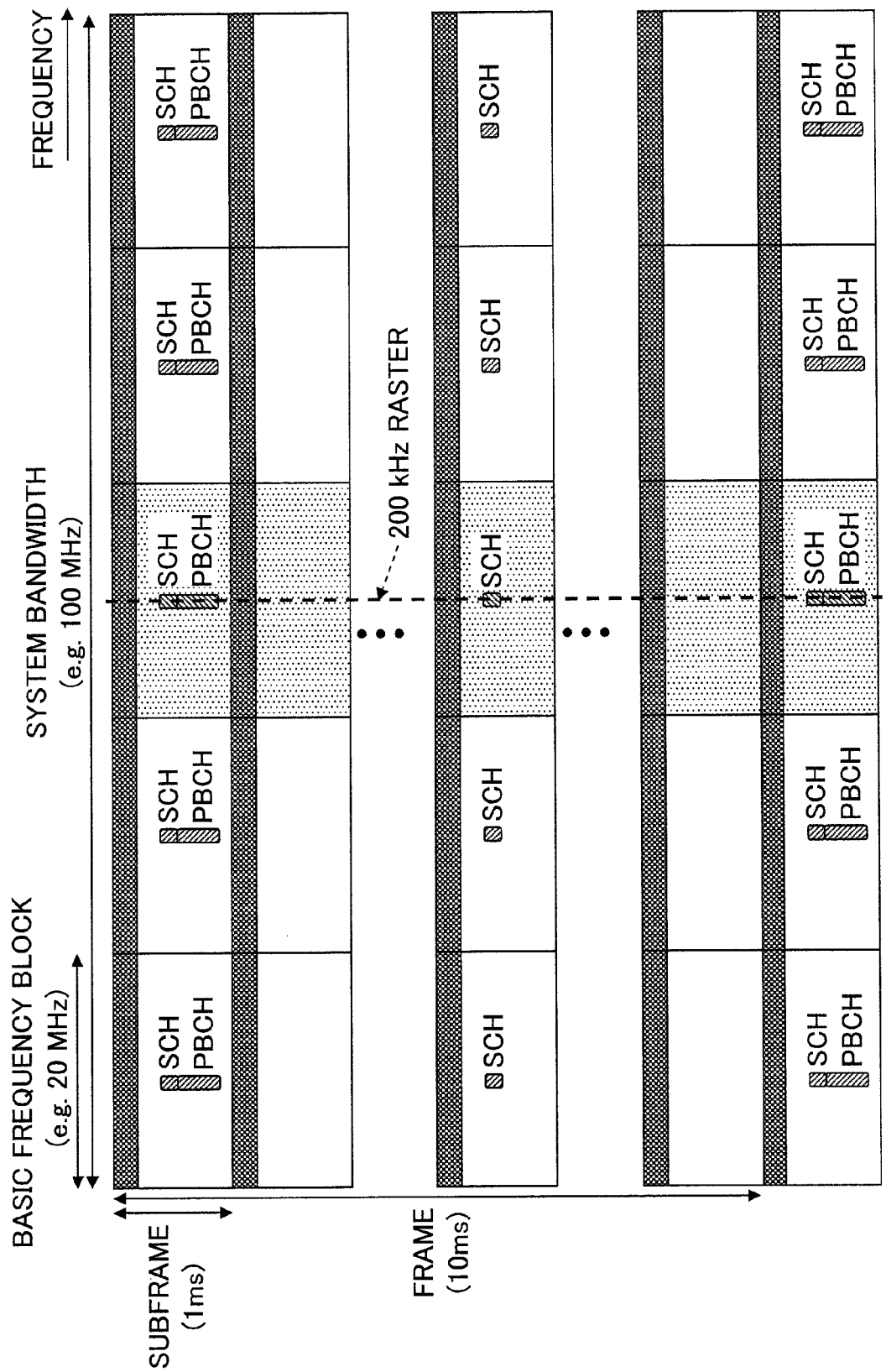
FIG. 12 shows a fourth exemplary configuration of a synchronization channel and a broadcast channel in accordance with an embodiment of the present invention.

FIG. 12 shows a fourth exemplary configuration of the synchronization channel and the broadcast channel. In the fourth exemplary configuration, the synchronization channel and the broadcast channel are mapped to all the basic frequency blocks. According to this channel configuration, the mobile station needs to shift to the frequency blocks which are allocated to the mobile station in step S111 in FIG. 8, but need not get back to the original predetermined basic frequency block in order to receive information on the synchronization channel and broadcast channel.

While FIGS. 9-12 show that the synchronization channel or the broadcast channel is included in the center basic frequency block as the predetermined basic frequency block, the synchronization channel or the broadcast channel may be included in one or more basic frequency blocks.

<Configuration of a Mobile Station>

Figure 13:
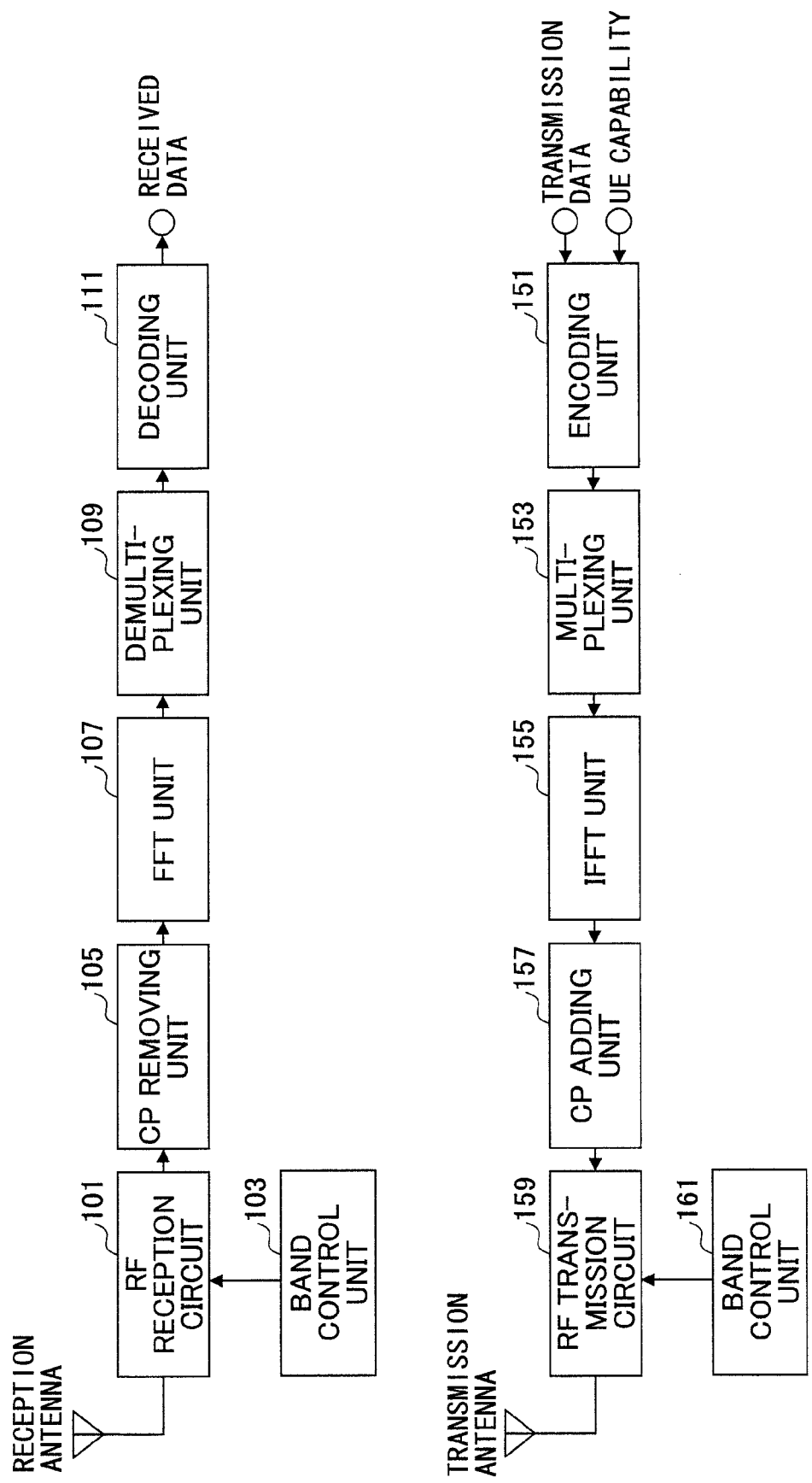
FIG. 13 shows a block diagram of a mobile station in accordance with an embodiment of the present invention.

With reference to FIG. 13, the configuration of a mobile station 10 in accordance with an embodiment of the present invention is described below.

A receiver of the mobile station 10 includes an RF reception circuit 101, a band control unit 103, a CP removing unit 105, an FFT (Fast Fourier Transform) unit 107, a demultiplexing unit 109, and a decoding unit 111.

Downlink signals received by a reception antenna are supplied to the RF reception circuit 101. The RF reception circuit 101 obtains information about the reception band from the band control unit 103 and receives the downlink signals with the reception band.

The band control unit 103 controls the reception band of the mobile station 10. For example, in the case of initial cell search, the band control unit 103 controls the reception band so as to perform cell search in a predetermined basic frequency block (for example, the center basic frequency block). When the mobile station receives data from the base station, the band control unit 103 controls the reception band so as to receive data in one or more basic frequency blocks allocated by the base station. When the synchronization channel or the broadcast channel is included only in the predetermined basic frequency block (for example, the center basic frequency block), the band control information 103 controls the reception band so as to communicate (camp) in the predetermined basic frequency block to receive information on the synchronization channel and the broadcast channel.

The CP removing unit 105 removes the guard interval (CP: cyclic prefix) from the downlink signals received by the RF reception circuit 101, and the FFT unit 107 performs Fast Fourier Transform to convert the signals into the frequency domain. The demultiplexing unit 109 demultiplexes the signals converted into the frequency domain into information on the respective channels. The decoding unit 111 decodes received data.

A transmitter of the mobile station 10 includes an encoding unit 151, a multiplexing unit 153, an IFFT (Inverse Fast Fourier Transform) unit 155, a CP adding unit 157, an RF transmission circuit 159, and a band control unit 161.

The encoding unit 151 encodes transmission data to be transmitted from the mobile station 10. The multiplexing unit 153 multiplexes the transmission data and information on the respective channels. When the UE capability is transmitted to the base station using the RACH message, the UE capability is also encoded by the encoding unit 151 along with the transmission data and multiplexed by the multiplexing unit 153 with the information on the respective channels. The IFFT unit 155 performs Inverse Fast Fourier Transform of the multiplexed uplink signals to convert the signals into the time domain. The CP adding unit 157 adds the guard interval (CP: cyclic prefix) to the uplink signals, which are transmitted from the RF transmission circuit 159. The band control unit 161 controls the transmission band so as to transmit data in one or more basic frequency blocks allocated by the base station.

<Configuration of a Base Station>

With reference to FIG. 14, the configuration of a base station 20 in accordance with an embodiment of the present invention is described below. The base station 20 includes a RACH receiving unit 201, a UE band allocating unit 203, and a multiplexing unit 205.

The RACH receiving unit 201 receives an UE capability regarding the bandwidth from the mobile station. The UE band allocating unit 203 allocates one or more basic frequency blocks to the mobile station based on the received UE capability. For example, when the same bandwidth as the UE capability can be allocated, the UE band allocating unit 203 allocates the band corresponding to the received UE capability. When there are not enough radio resources, the UE band allocating unit 203 may allocate a narrower band than the received UE capability. The multiplexing unit 205 multiplexes information about the band allocated to the mobile station into L2 control information or L3 control information, and multiplexes band information about the basic frequency block (the predetermined basic frequency block) into broadcast information. In addition, information about the system band may be multiplexed into the broadcast information. These types of information are transmitted to the mobile station.

It should be noted that cell search is performed on the synchronization channel in the present invention (not shown).

In the embodiments of the present invention, migration from the existing radio access system such as the E-UTRA system to the new radio access system such as the IMT-Advanced system is taken as an example. However, the present invention is not limited to these embodiments, but can be applied to any radio access system in which full support of the existing terminals and a wider bandwidth are required.

This international patent application is based on Japanese Priority Application No. 2008-088104 filed on Mar. 28, 2008, the entire contents of which are incorporated herein by reference.

The invention claimed is:

1. A base station, comprising:
a multiplexing unit configured to multiplex a broadcast channel and a synchronization channel into each of plural basic frequency blocks included in a system band;

a receiving unit configured to receive a UE capability regarding a bandwidth from a mobile station; and a specifying unit, coupled to the receiving unit, configured to specify, using RRC (Radio Resource Control) signaling information in a predetermined basic frequency block, among the plural basic frequency blocks included in the system band, one or more basic frequency blocks to be used by the mobile station based on the UE capability, when the system band formed by combining the plural basic frequency blocks each of which is originally configured based on a transmission and reception bandwidth with which communication can be performed, regardless of UE capabilities is used;

wherein communication with the mobile station is maintained in the predetermined basic frequency block, after communication with the mobile station is started in the one or more basic frequency blocks.

2. The base station as claimed in claim 1, wherein:

the specifying unit specifies, among the plural basic frequency blocks which are formed by dividing the system band based on a maximum transmission and reception bandwidth of the mobile station, the one or more basic frequency blocks.

3. The base station as claimed in claim 1, wherein:

the specifying unit specifies, among the plural basic frequency blocks in which a guard band between mutually adjacent basic frequency blocks is reduced or removed, the one or more basic frequency blocks.

4. A mobile station, comprising:

a transmitting unit configured to transmit a UE capability regarding a bandwidth to a base station;

a control unit configured to set, among plural basic frequency blocks included in a system band, a transmission or reception band to one or more basic frequency blocks specified using RRC (Radio Resource Control) signaling information in a predetermined basic frequency block from the base station based on the UE capability, when the system band formed by combining the plural basic frequency blocks each of which is originally configured based on a transmission and reception bandwidth with which communication can be performed regardless of UE capabilities is used; and a receiving unit configured to receive a broadcast channel and a synchronization channel multiplexed into each of the plural basic frequency blocks included in the system band;

wherein the control unit maintains communication with the base station in the predetermined frequency block, after communication with the base station is started in the one or more basic frequency blocks.

5. A basic frequency block specifying method in a base station, comprising the steps of:

multiplexing a broadcast channel and a synchronization channel into each of plural basic frequency blocks included in a system band;

receiving a UE capability regarding a bandwidth from a mobile station; and specifying, using RRC (Radio Resource Control) signaling information in a predetermined basic frequency block, among the plural basic frequency blocks included in the system band, one or more basic frequency blocks to be used by the mobile station based on the UE capability, when the system band formed by combining the plural basic frequency blocks each of which is originally configured based on a transmission and reception bandwidth with which communication can be performed regardless of UE capabilities is used;

wherein communication with the mobile station is maintained in the predetermined basic frequency block, after communication with the mobile station is started in the one or more basic frequency blocks.

6. A band control method in a mobile station, comprising the steps of:

transmitting a UE capability regarding a bandwidth to a base station;

setting, among plural basic frequency blocks included in a system band, a transmission or reception band to one or more basic frequency blocks specified using RRC (Radio Resource Control) signaling information in a predetermined basic frequency block from the base station based on the UE capability, when the system band formed by combining the plural basic frequency blocks each of which is originally configured based on a transmission and reception bandwidth with which communication can be performed regardless of UE capabilities is used; and receiving a broadcast channel and a synchronization channel multiplexed into each of the plural basic frequency blocks included in the system band;

wherein communication with the base station is maintained in the predetermined basic frequency block, after communication with the base station is started in the one or more basic frequency blocks.

7. The base station according to claim 1, wherein a guard band between mutually adjacent basic frequency blocks is narrower than a guard band provided outside the ends of the plural basic frequency blocks.

8. The mobile station according to claim 4, wherein a guard band between mutually adjacent basic frequency blocks is narrower than a guard band provided outside the ends of the plural basic frequency blocks.

9. The basic frequency block specifying method according to claim 5, wherein a guard band between mutually adjacent basic frequency blocks is narrower than a guard band provided outside the ends of the plural basic frequency blocks.

10. The band control method according to claim 6, wherein a guard band between mutually adjacent basic frequency blocks is narrower than a guard band provided outside the ends of the plural basic frequency blocks.

* * * * *